(12) United States Patent
Colley et al.

(10) Patent No.: US 10,241,598 B2
(45) Date of Patent: Mar. 26, 2019

(54) APPARATUS, METHOD, COMPUTER PROGRAM AND USER INTERFACE

(75) Inventors: Ashley Colley, Oulu (FI); Kari Matias Severinkangas, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 99 days.

(21) Appl. No.: 13/446,636

(22) Filed: Apr. 13, 2012

(65) Prior Publication Data

US 2012/0262399 A1    Oct. 18, 2012

(30) Foreign Application Priority Data

Apr. 15, 2011    (GB) .................................. 1106380.7

(51) Int. Cl.
| | | |
|---|---|---|
| *G06F 3/041* | (2006.01) | |
| *G06F 3/048* | (2013.01) | |
| *G06F 3/0488* | (2013.01) | |
| *G06F 3/0482* | (2013.01) | |

(52) U.S. Cl.
CPC .............. *G06F 3/041* (2013.01); *G06F 3/048* (2013.01); *G06F 3/0416* (2013.01); *G06F 3/0482* (2013.01); *G06F 3/0488* (2013.01)

(58) Field of Classification Search
CPC ........ G06F 3/0488; G06F 3/048; G06F 3/016; G06F 3/0428; G06F 3/041; G06F 3/04842; G06F 3/0482; G06F 3/044; G06F 3/0484; G06F 3/04886; H04N 5/4403
USPC ................................................ 345/173, 175
See application file for complete search history.

(56) References Cited

U.S. PATENT DOCUMENTS

| | | | |
|---|---|---|---|
| 2006/0017709 A1 | 1/2006 | Okano | |
| 2006/0026535 A1* | 2/2006 | Hotelling | G06F 3/0418 715/863 |
| 2006/0161871 A1* | 7/2006 | Hotelling | G06F 3/0485 715/863 |
| 2006/0284858 A1 | 12/2006 | Rekimoto | |
| 2008/0024682 A1* | 1/2008 | Chen | H04N 5/4403 348/734 |
| 2009/0184935 A1 | 7/2009 | Kim | |
| 2009/0327968 A1* | 12/2009 | Porat et al. | 715/841 |

(Continued)

FOREIGN PATENT DOCUMENTS

| | | |
|---|---|---|
| EP | 0 227 064 A1 | 7/1987 |
| EP | 2 249 240 A1 | 11/2010 |

(Continued)

OTHER PUBLICATIONS

"Quick Security Lock for Touch Screen Device (gesture)"; ip.com Journal ISSN 1533-0001 dated Jan. 28, 2011.

(Continued)

*Primary Examiner* — Robert J Michaud
(74) *Attorney, Agent, or Firm* — Alston & Bird LLP

(57) ABSTRACT

A method, apparatus, computer program and user interface wherein the method comprises: displaying an item at a location on a touch sensitive display; detecting actuation of an area of the touch sensitive display wherein the actuated area comprises at least a portion of the location in which the item is displayed; and in response to the detecting, enabling a function to be performed wherein if a first area is actuated a first function, dependent on the item, is enabled and if a second area is actuated a second, different function, independent of the item, is enabled.

17 Claims, 10 Drawing Sheets

(56) References Cited

U.S. PATENT DOCUMENTS

| | | | |
|---|---|---|---|
| 2010/0020027 A1* | 1/2010 | Park | G06F 3/0482 345/173 |
| 2010/0056221 A1* | 3/2010 | Park | G06F 3/048 455/566 |
| 2010/0156808 A1 | 6/2010 | Stallings et al. | |
| 2010/0220066 A1 | 9/2010 | Murphy | |
| 2010/0265185 A1* | 10/2010 | Oksanen | G06F 3/0488 345/173 |
| 2010/0279738 A1* | 11/2010 | Kim | G06F 3/016 455/566 |
| 2010/0289754 A1 | 11/2010 | Sleeman et al. | |
| 2010/0321321 A1 | 12/2010 | Shenfield et al. | |
| 2010/0321322 A1 | 12/2010 | Sohn | |
| 2011/0050619 A1* | 3/2011 | Griffin | G06F 3/0416 345/174 |
| 2011/0074695 A1* | 3/2011 | Rapp et al. | 345/173 |
| 2013/0120278 A1* | 5/2013 | Cantrell | G06F 3/04886 345/173 |

FOREIGN PATENT DOCUMENTS

| | | |
|---|---|---|
| EP | 2 306 284 A1 | 4/2011 |
| GB | 2468891 A | 9/2010 |

OTHER PUBLICATIONS

Office Action from Great Britain Application No. 1206524.9 dated Aug. 3, 2012.

\* cited by examiner

APPARATUS, METHOD, COMPUTER PROGRAM AND USER INTERFACE

TECHNOLOGICAL FIELD

Embodiments of the present invention relate to an apparatus, method, computer program and user interface. In particular, they relate to an apparatus, method, computer program and user interface for enabling a user to make user inputs.

BACKGROUND

Apparatus which enable a user to make user inputs are well known. The user inputs may enable a user to input information into the apparatus or to control the apparatus. Where an apparatus has a plurality of available functions it is useful to enable a user to make user inputs which enable them to easily access the respective functions

BRIEF SUMMARY

According to various, but not necessarily all, embodiments of the invention there is provided a method comprising: displaying an item at a location on a touch sensitive display; detecting actuation of an area of the touch sensitive display wherein the actuated area comprises at least a portion of the location in which the item is displayed; and in response to the detecting, enabling a function to be performed wherein if a first area is actuated a first function, dependent on the item, is enabled and if a second area is actuated a second, different function, independent of the item, is enabled.

In some embodiments the second function may comprise a generic function.

In some embodiments the first area and the second area may at least partially overlap.

In some embodiments of the invention the item may be one of a plurality of items simultaneously displayed on the touch sensitive display. The second function may be the same for any of the plurality of items displayed on the touch sensitive display.

In some embodiments of the invention, if a third area is actuated a third, different function may be enabled.

In some embodiments of the invention at least one of the functions which is enabled may comprise highlighting the item.

The item may comprise a menu item. The menu item may be an item within a first level of a multilevel menu structure and the first function may enable a function to be performed on the menu item and the second, different function may enable access to a different level of the menu structure.

In some embodiments of the invention the item may be associated with a first application and the first function which is enabled may be a function of the application and the second, different function which is enabled may be a generic function of an apparatus.

In some embodiments of the invention the item may be associated with a first application and the first function which is enabled may be a function of the application and the second, different function which is enabled may be a function of a second, different application.

In some embodiments of the invention the first area may comprise a different size of area to the second area.

In some embodiments of the invention the first area may comprise a different orientation to the second area.

In some embodiments of the invention the first area may comprise a different shape to the second area.

In some embodiments of the invention the functions may be enabled in response to detection that the area has been actuated for a predetermined time.

In some embodiments of the invention the second function may be enabled in response to detection of a change of the actuated area from the first area to the second area.

In some embodiments of the invention the first function may be enabled in response to detection of a change of the actuated area back to the first area from the second area.

In some embodiments the second function may relate to information which is not displayed on the display when the second area is initially actuated. When the second function is enabled the display may be configured to display further information relating to the second function. The second function may be enabled in response to the detection of the actuation of an area and a trace user input.

According to various, but not necessarily all, embodiments of the invention there is provided an apparatus comprising: at least one processor; and at least one memory including computer program code; wherein the at least one memory and the computer program code are configured to, with the at least one processor, enable the apparatus to: display an item at a location on a touch sensitive display; detect actuation of an area of the touch sensitive display wherein the actuated area comprises at least a portion of the location in which the item is displayed; and enable, in response to the detection, a function to be performed wherein if a first area is actuated a first function, dependent on the item, is enabled and if a second area is actuated a second, different function, independent of the item, is enabled.

In some embodiments the second function may comprise a generic function.

In some embodiments the first area and the second area may at least partially overlap.

In some embodiments of the invention the item may be one of a plurality of items simultaneously displayed on the touch sensitive display. The second function may be the same for any of the plurality of items displayed on the touch sensitive display.

In some embodiments of the invention if a third area is actuated a third, different function may be enabled.

In some embodiments of the invention the at least one of the functions which is enabled may comprise highlighting the item.

In some embodiments of the invention the item may comprise a menu item. The menu item may be an item within a first level of a multilevel menu structure and the first function may enable a function to be performed on the menu item and the second, different function may enable access to a different level of the menu structure.

In some embodiments of the invention the item may be associated with a first application and the first function which is enabled may be a function of the application and the second, different function which is enabled may be a generic function of an apparatus.

In some embodiments of the invention the item may be associated with a first application and the first function which is enabled may be a function of the application and the second, different function which is enabled may be a function of a second, different application.

In some embodiments of the invention the first area may comprise a different size of area to the second area.

In some embodiments of the invention the first area may comprise a different orientation to the second area.

In some embodiments of the invention the first area may comprise a different shape to the second area.

In some embodiments of the invention the functions may be enabled in response to detection that the area has been actuated for a predetermined time.

In some embodiments of the invention the second function may be enabled in response to detection of a change of the actuated area from the first area to the second area.

In some embodiments of the invention the first function may be enabled in response to detection of a change of the actuated area back to the first area from the second area.

In some embodiments the second function may relate to information which is not displayed on the display when the second area is initially actuated. When the second function is enabled the display may be configured to display further information relating to the second function. The second function may be enabled in response to the detection of the actuation of an area and a trace user input.

According to various, but not necessarily all, embodiments of the invention there is provided a computer program comprising computer program instructions that, when executed by at least one processor, enable an apparatus at least to perform: displaying an item at a location on a touch sensitive display; detecting actuation of an area of the touch sensitive display wherein the actuated area comprises at least a portion of the location in which the item is displayed; and in response to the detecting, enabling a function to be performed wherein if a first area is actuated a first function, dependent on the item, is enabled and if a second area is actuated a second, different function, independent of the item, is enabled.

In some embodiments of the invention the computer program may comprise program instructions for causing a computer to perform the method of any of the above paragraphs.

In some embodiments of the invention there may be provided a physical entity embodying the computer program of any of the above paragraphs.

In some embodiments of the invention there may be provided an electromagnetic carrier signal carrying the computer program of any of the above paragraphs.

According to various, but not necessarily all, embodiments of the invention there is provided a user interface comprising: a touch sensitive display: wherein the touch sensitive display is configured to display an item at a location on a touch sensitive display; detect actuation of an area of the touch sensitive display wherein the actuated area comprises at least a portion of the location in which the item is displayed; and enable, in response to the detection, a function to be performed wherein if a first area is actuated a first function, dependent on the item, is enabled and if a second area is actuated a second, different function, independent of the item, is enabled.

In some embodiments of the invention if a third area is actuated a third, different function may be enabled.

According to various, but not necessarily all, embodiments of the invention there is provided a method comprising: displaying information on a touch sensitive display; detecting actuation of an area of the touch sensitive display; and in response to the detecting, enabling a function to be performed wherein if a first area is actuated a first function relating to the displayed information is enabled and if a second area is actuated a second, different function relating to information which is not displayed is enabled.

In some embodiments of the invention the first function may be associated with a first application and the second function may be associated with a second different application.

In some embodiments of the invention the first function may be associated with a first application and the second function may be a general function of an apparatus.

In some embodiments of the invention when the second function is enabled the display may be configured to display further information relating to the second function.

In some embodiments of the invention the function may be enabled in response to the detection of the actuation of an area and a trace user input.

According to various, but not necessarily all, embodiments of the invention there is provided an apparatus comprising: at least one processor; and at least one memory including computer program code; wherein the at least one memory and the computer program code are configured to, with the at least one processor, enable the apparatus to: display information on a touch sensitive display; detect actuation of an area of the touch sensitive display; and in response to the detecting, enable a function to be performed wherein if a first area is actuated a first function relating to the displayed information is enabled and if a second area is actuated a second, different function relating to information which is not displayed is enabled.

A computer program comprising computer program instructions that, when executed by at least one processor, enable an apparatus at least to perform:

displaying information on a touch sensitive display; detecting actuation of an area of the touch sensitive display; and in response to the detecting, enabling a function to be performed wherein if a first area is actuated a first function relating to the displayed information is enabled and if a second area is actuated a second, different function relating to information which is not displayed is enabled.

According to various, but not necessarily all, embodiments of the invention there is provided a user interface comprising: a touch sensitive display: wherein the touch sensitive display is configured to display information; detect actuation of an area of the touch sensitive display; and in response to the detecting, enable a function to be performed wherein if a first area is actuated a first function relating to the displayed information is enabled and if a second area is actuated a second, different function relating to information which is not displayed is enabled.

The apparatus may be for wireless communications.

BRIEF DESCRIPTION

For a better understanding of various examples of embodiments of the present invention reference will now be made by way of example only to the accompanying drawings in which:

FIG. 1 schematically illustrates an apparatus according to an exemplary embodiment of the invention;

FIG. 2 schematically illustrates an apparatus according to another exemplary embodiment of the invention;

DETAILED DESCRIPTION

The Figures illustrate a method comprising: displaying an item at a location on a touch sensitive display; detecting actuation of an area of the touch sensitive display wherein the actuated area comprises at least a portion of the location in which the item is displayed; and in response to the detecting, enabling a function to be performed wherein if a first area is actuated a first function is enabled and if a second area is actuated a second, different function is enabled.

Figure 1:
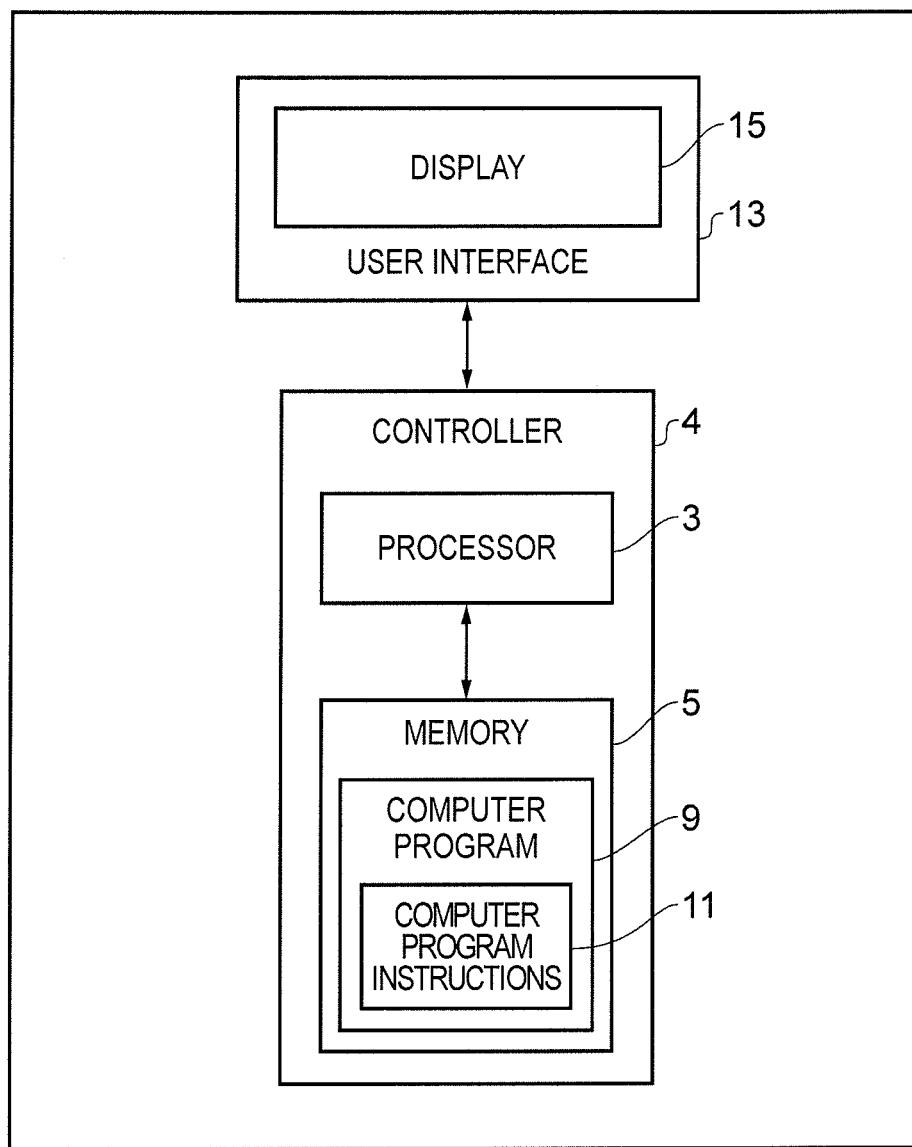

FIG. 1 schematically illustrates an apparatus 1 according to an embodiment of the invention. The apparatus 1 may be an electronic apparatus. The apparatus 1 may be, for example, a mobile cellular telephone, a tablet computer, a personal computer, a camera, a gaming device, a personal digital assistant, a personal music player or any other apparatus. The apparatus 1 may be a handheld apparatus 1 which can be carried in a user's hand, handbag or jacket pocket for example.

Figure 2:
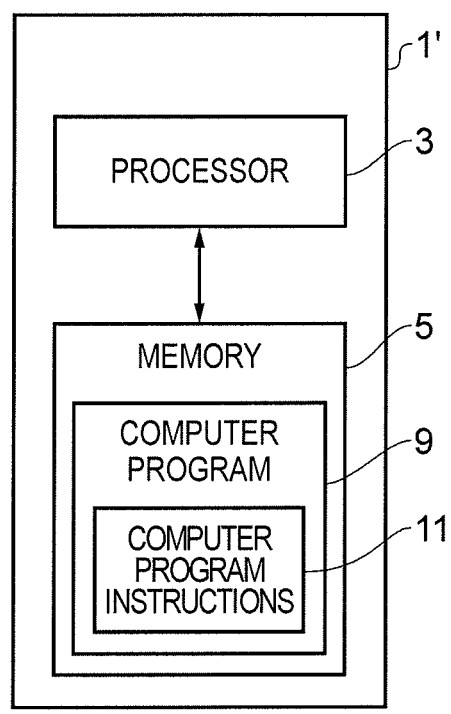

Only features of the apparatus 1 referred to in the following description are illustrated in FIGS. 1 and 2. However, it should be understood that the apparatus 1 may comprise additional features that are not illustrated. For example, in embodiments where the apparatus 1 is configured to enable communication such as telephone calls or messages the apparatus 1 may also comprise one or more transmitters and receivers.

The exemplary apparatus 1 illustrated in FIG. 1 comprises: a user interface 13 and a controller 4. In the illustrated exemplary embodiment the controller 4 comprises at least one processor 3 and at least one memory 5 and the user interface 13 comprises at least a touch sensitive display 15.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3.

The at least one processor 3 is configured to receive input commands from the user interface 13 and also to provide output commands to the user interface 13. The at least one processor 3 is also configured to write to and read from the at least one memory 5. Outputs of the user interface 13 are provided as inputs to the controller 4.

The touch sensitive display 15 may comprise any means which enables information to be displayed to a user of the apparatus 1. The information may correspond to information which has been input by the user via the touch sensitive display 15 or any other user input device, information which is stored in the one or more memories 5 or information which has been received by apparatus 1.

The touch sensitive display 15 may be configured to display graphical user interfaces 51 as illustrated in FIGS. 5 to 11.

The touch sensitive display 15 may comprise any means which is configured to detect touch inputs. A user of the apparatus 1 may make a touch input by actuating the surface of the touch sensitive display 15. The surface of the touch sensitive display 15 may be actuated by a user using their finger or thumb or any other suitable object such as a stylus to physically make contact with the surface. In some embodiments of the invention the user may also be able to actuate the touch sensitive display 15 by bringing their finger, thumb or stylus close to the surface of the touch sensitive display 15. In exemplary embodiments of the invention the touch sensitive display 15 may be a capacitive touch sensitive display or a resistive touch sensitive display or any other suitable type of display.

The output of the touch sensitive display 15 is provided as an input to the controller 4. The output of the touch sensitive display 15 may depend upon the type of actuation of the touch sensitive display 15 and also the location of the area actuated by the user input. The controller 4 may be configured to determine the type of input which has been made and also the location of the user input and enable the appropriate function to be performed in response to the detected input.

The controller 4 may be configured to determine the area of the touch sensitive display 15 actuated by the user input. The controller may use any suitable method to determine the actuated area. For example, the controller 4 may be configured to determine the height and width of the actuated area. From the values of the height and width the controller 4 may be able to determine the size of the actuated area, the shape of the actuated area. In some exemplary embodiments of the invention the controller 4 may be able to determine the orientation of the actuated area. The orientation of the actuated area may be the angle of an axis of the actuated area with respect to an axis of the touch sensitive display 15. For example, the actuated area may be aligned substantially horizontally or vertically with respect to the touch sensitive display 15. In some embodiments the controller 4 may be configured to detect if the actuated area is oriented at an interred angle such as 30° or 60°. This enables the controller 4 to distinguish between different user inputs on the basis of the area which has been actuated by the user. The function which is enabled may be determined by the context of the user input. The context of the user input may include, for example, the area actuated, the location of the area actuated, the information and/or items which are currently displayed on the touch sensitive display 15 and the applications which are currently being used by the apparatus 1.

In some embodiments of the invention the user interface 13 may also comprise other user input devices in addition to a touch sensitive display 15 such as one or more keys, a joy stick, or any other user input device which enables a user of the apparatus 1 to control the apparatus 1.

The at least one memory 5 may be configured to store a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3 and 4 and described below. The at least one processor 3 by reading the at least one memory 5 is able to load and execute the computer program code 9.

The computer program instructions 11 may provide computer readable program means configured to control the apparatus 1. The program instructions 11 may provide, when loaded into the controller 4; means for displaying an item at a location on a touch sensitive display; means for detecting actuation of an area of the touch sensitive display wherein the actuated area comprises at least a portion of the location in which the item is displayed; and means for enabling, in response to the detecting, a function to be performed wherein if a first area is actuated a first function is enabled and if a second area is actuated a second, different function is enabled.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD or an article of manufacture that tangibly embodies the computer program code 9. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi- processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIG. 2 illustrates an apparatus 1' according to another embodiment of the invention. The apparatus 1' illustrated in FIG. 2 may be a chip or a chip-set. The apparatus 1' comprises at least one processor 3 and at least one memory 5 as described above in relation to FIG. 1.

Figure 3:
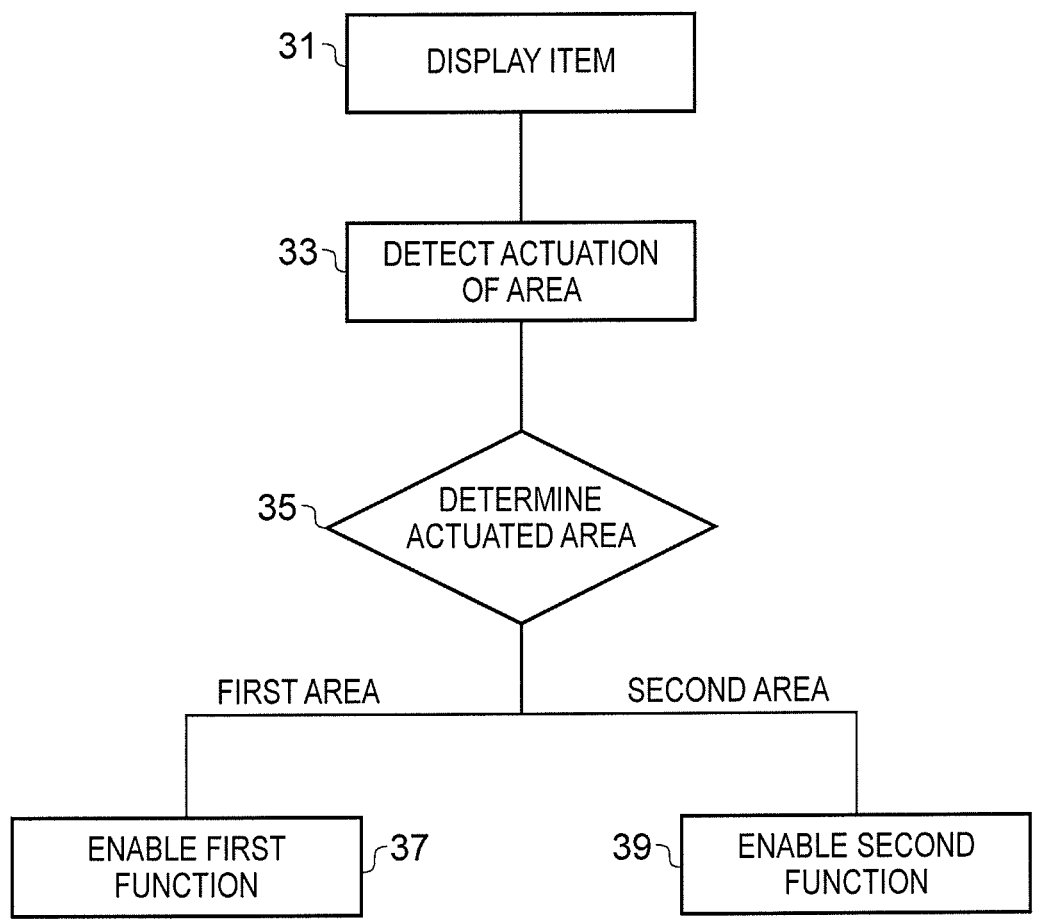
FIG. 3 is a block diagram which schematically illustrates a method according to an exemplary embodiment of the invention.
Figure 4:
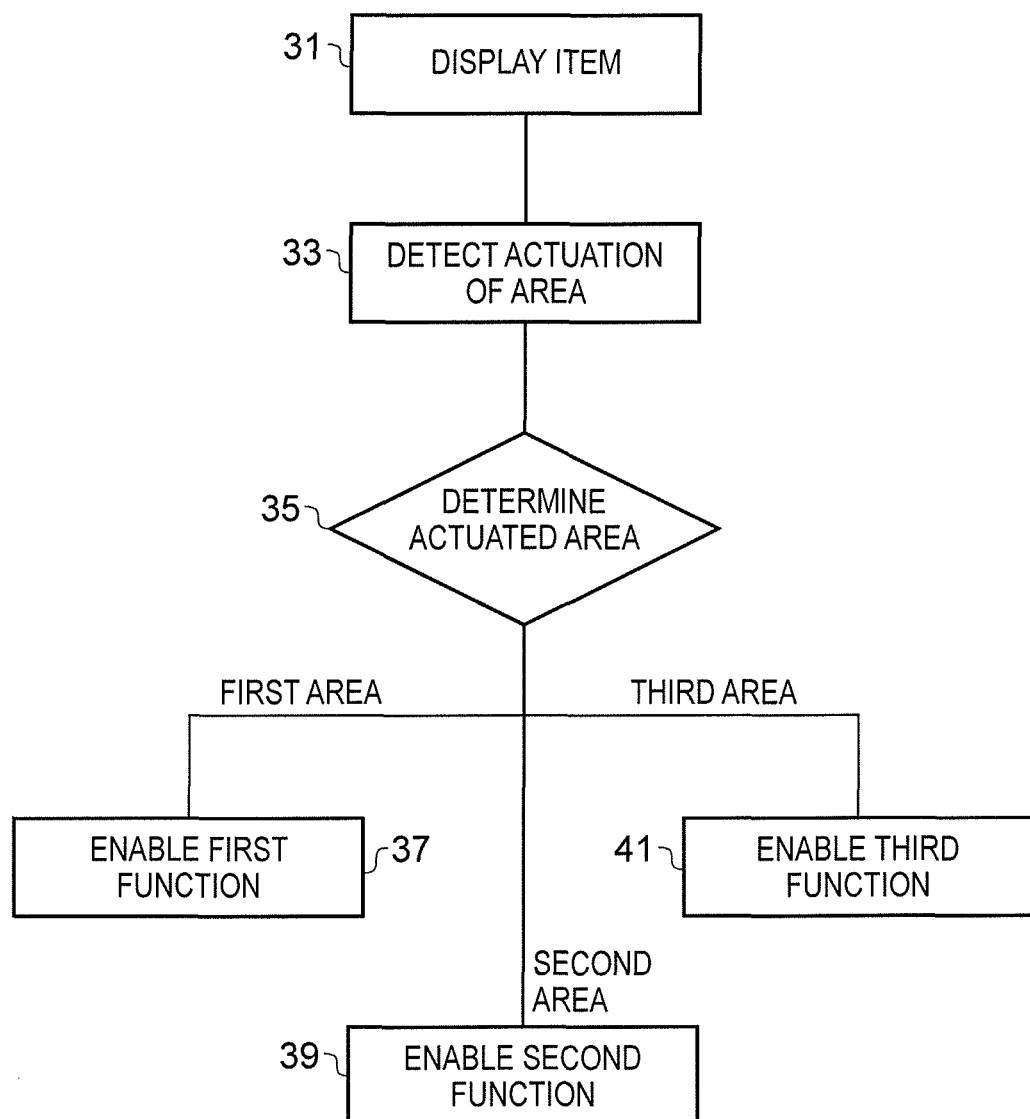
FIG. 4 is a block diagram which schematically illustrates a method according to another exemplary embodiment of the invention.

FIGS. 3 and 4 illustrate methods according to exemplary embodiments of the invention.

At block 31 the controller 4 controls the touch sensitive display 15 to display an item.

The item may be one of a plurality of items which are simultaneously displayed on the touch sensitive display 15. For example, the plurality of items may comprise a list of user selectable items where each item in the list is associated with content or a function of the apparatus 1. In the exemplary embodiments illustrated in FIGS. 5 to 9 the plurality of items comprises a contacts list. The items in the contact list enable a user to access content such as telephone or address information relating to the particular contact. The items in the list comprise labels identifying the contacts. It is to be appreciated by a person skilled in the art that in other embodiments of the invention the items may be associated with different types of content, for example the list may relate to audio or audio visual files, or a list of messages which have been received by the apparatus 1 or a list of notifications from a networking or subscriber service.

In some embodiments of the invention the item may be a menu item within a menu. The menu may be any list of user selectable options. For example, the user selectable options may relate to functions or applications of the apparatus 1 or to content accessible by the apparatus 1. In some embodiments of the invention the menu may be a multi level menu. Each level of the multi level menu may comprise one or more user selectable items. A user may be able to navigate through the multi level menu by selecting appropriate items within the multi level menu.

At block 33 the controller 4 detects actuation of the area of the touch sensitive display 15. The actuation may be a user touching the touch sensitive display 15 with one or more of their fingers or thumbs or a stylus as described above. In some embodiments of the invention the user may actuate the touch sensitive display 15 by touching the touch sensitive display 15 with a finger or thumb and maintaining their finger or thumb in substantially the same location. In other embodiments of the invention the user may roll their finger or thumb around the touch sensitive display 15, so as to enable the user to control the size, shape and orientation of the area which is actuated.

The area of the touch sensitive display 15 which is actuated may comprise at least a portion of the location at which the item is displayed. The actuated area may be a different size or shape to the displayed item and so the actuated area need not correspond exactly to the area in which the item is displayed. The controller 4 may be configured to determine the location of the area which has been actuated and whether or not this corresponds to the location of the displayed item.

At block 35 the controller 4 determines the area which has been actuated.

It is to be appreciated by a person skilled in the art that there are many ways in which a user may actuate different sized or shaped areas of the touch sensitive display 15 and so in various embodiments of the invention the controller 4 may be configured to distinguish between these different types of actuation. For example, the size of the area which is actuated may depend on which fingers or thumbs the user has used, the force applied by the user to the touch sensitive display 15 and whether or not the user has moved their fingers or thumbs when making the input.

In some embodiments of the invention the controller 4 may determine the size of the area which has been actuated and use this to distinguish between different types of user input. For example the controller 4 may determine whether or not the actuated area falls below a threshold size or above a threshold size. The threshold size may relate to the entire area or to one specific dimension of the area, for example the height or width of the area.

In some embodiments of the invention the controller 4 may determine the shape of the area which has been actuated. The shape of the area which has been actuated may be determined from the height and width of the actuated area.

In some embodiments of the invention the controller 4 may determine the orientation of the area. For example the shape of the actuated area may be an elongated shape, such as an ellipse with a major axis and a minor axis. The controller 4 may be configured to determine the angle at which the respective axis of the ellipse are aligned with axis of the touch sensitive display 15. For example, the controller 4 may be configured to determine whether or not the major axis is oriented substantially horizontally or substantially vertically and so determine an orientation of the actuated area. In other embodiments of the invention the controller 4 may be configured to detect if the actuated area is at an intermediate angle. For example, the major axis of the ellipse 11 may be aligned at an angle such as 30° or 60° or some other angle.

The user may be able to actuate the area in different orientations by changing the angle at which they touch the touch sensitive display 15. For example if they touch the touch sensitive display 15 with an index finger pointing substantially upwards this would be a different orientation to touching the touch sensitive display 15 with their index finger pointing substantially to the left or right.

The controller 4 may be configured to map different areas to different functions so that the functions which are enabled may depend on the size, shape and orientation of the area which has been actuated. If, at block 35, the controller 4 determines that a first area has been actuated then the method proceeds to block 37 and the controller enables a first function to be performed. Conversely, if at block 35, the controller 4 determines that a second area has been actuated then the method proceeds to block 39 and the controller enables a second, different function to be performed.

The functions which are enabled may depend upon the item which is displayed in the location of the touch sensitive display 15 which has been actuated. In some embodiments of the invention the functions which are enabled may depend on applications which are being used by the apparatus 1. The applications which are being accessed need not have corresponding content currently displayed on the touch sensitive display 15. For example the apparatus 1 may be configured to perform a plurality of tasks simultaneously but need not display content relating to each task while it is being performed.

FIG. 4 illustrates a method according to another exemplary embodiment of the invention. The method illustrated in FIG. 4 is similar to the method illustrated in FIG. 3. Where the blocks of the method are the same as those in FIG. 3 the same reference numerals have been used.

As in the previously described method at block 31 the controller 4 controls the touch sensitive display 15 to display an item, at block 33 the controller 4 detects actuation of an area of the touch sensitive display 15 and at block 35 the controller 4 determines the area which has been actuated.

In the method illustrated in FIG. 4 the controller 4 may be configured to distinguish between more than two different areas which have been actuated. In the exemplary embodiment illustrated in FIG. 4 the controller can distinguish between three different areas so that if the controller 4 determines that a first area has been actuated then at block 37 the controller 4 enables a first function to be performed. If the controller 4 determines that a second area has been actuated then, at block 39, the controller 4 enables a second, different function to be performed. If the controller 4 determines that a third area has been actuated then, at block 41, the controller 4 enables a third, different function to be performed. It is to be appreciated by a person skilled in the art that in other embodiments of the invention the controller 4 may be configured to distinguish between more than three different actuated areas and so enable more than three different functions to be enabled.

FIGS. 5 to 11 illustrate graphical user interfaces 51 according to exemplary embodiments of the invention. The graphical user interfaces 51 may be displayed on the touch sensitive display 15.

Figure 5:
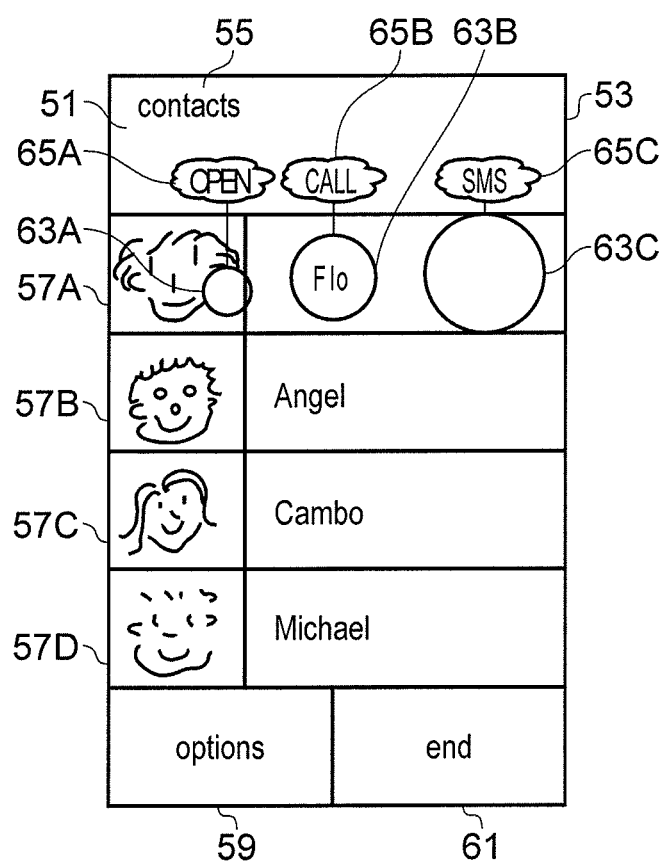
FIG. 5 illustrates a graphical user interface according to a first exemplary embodiment of the invention.

In the exemplary embodiment of the invention illustrated in FIG. 5 the graphical user interface 51 comprises a list 53 of items 57A to 57D. In the exemplary embodiment of FIG. 5 the list 53 is a contact list. A label 55 is displayed indicating to a user that the list 53 is a contact list.

Each item 57A to 57D in the list may be associated with content. The content may be stored in the one or more memories 5 of the apparatus 1. The content may comprise information such as the contact details or other personal information of a particular contact. In the illustrated embodiment each item 57A to 57D in the list comprises a name and image which may be used to identify the contact or associated content.

In the illustrated embodiment four items 57A to 57D are displayed simultaneously. It is to be appreciated that any number of items may be displayed simultaneously in other embodiments of the invention. The list may comprise more items than can be displayed on the touch sensitive display 15. In such examples the user may be able to scroll through the list 53 to view the other items in the list 53.

In the exemplary illustrated embodiment the graphical user interface 51 also comprises items 59 and 61 which may provide a shortcut to specific functions of the apparatus 1. For example the item 59 labeled "options" may enable a user to access a menu of available functions. The item labeled "end" may enable the user to exit the contacts list 53.

In the embodiment illustrated in FIG. 5 the user may enable the apparatus 1 to perform a function on an item 57A to 57D in the list 53 by actuating an area which comprises at least a portion of the location in which the item 57A to 57D is displayed. The function which is performed may depend upon the size of the area which is actuated.

In the exemplary embodiment in FIG. 5 the controller 4 can distinguish between three different sized actuated areas. The different sized actuated areas 63A, 63B and 63C are illustrated in FIG. 5. These areas 63A, 63B and 63C represent areas which may have been actuated by the user. It is to be appreciated that these areas are illustrated in FIG. 5 for explanatory purposes and would not necessarily be actuated simultaneously. Also the three areas 63A, 63B and 63C have been illustrated adjacent to each other for the purpose of clarity. It is to be appreciated that in embodiments of the invention the actuated area could comprise any area which includes a portion of the first item 57A, and as such, may overlap in some embodiments of the invention.

In FIG. 5 the first area 63A is the smallest area relative to the other areas 63B, 63C. The controller 4 may determine that the first area 63A has been actuated if the dimensions of the actuated area fall below a first predetermined threshold. In FIG. 5 the first area 63A is associated with the function of "open". This enables the user to open the contact item 57A and view the content associated with the item 57A. A label 65A may be displayed on the touch sensitive display 15 to indicate the function that is to be enabled.

The second area 63B illustrated in FIG. 5 is larger than the first area 63A. The controller 4 may determine that the second area 63B has been actuated if the dimensions of the actuated area fall above the first predetermined threshold but below a second predetermined threshold. In FIG. 5 the second area 63B is associated with the function of "call". This enables the controller 4 to access a telephone number associated with the contact item 57A and establish a telephone call. A label 65B may be displayed on the touch sensitive display 15 to indicate the function that is to be enabled.

The third area 53C illustrated in FIG. 5 is larger than both the second area 63B and the first area 63A. The controller 4 may determine that the third area 53C has been actuated if the dimensions of the actuated area fall above a second predetermined threshold. In FIG. 5 the third area 53C is associated with the function of "SMS" (short message service). This enables the controller 4 to access a messaging application and enable a user to create a message which may then be sent to a telephone number stored under the contact item 57A. A label 65C may be displayed on the touch sensitive display 15 to indicate the function that is to be enabled.

In the particular embodiment illustrated in FIG. 5 each of the functions which are enabled in response to actuating different areas relates directly to the item 57A displayed in the location of the actuated area. That is, each of the functions which may be enabled uses the content or information associated with the displayed item 57A. This enables a user to easily access functions relating to the listed items and enable the various functions to be performed. This may be beneficial as it may enable a user to access a plurality of different functions without having to navigate through a menu of options.

In this exemplary embodiment the three areas 63A, 63B and 63C are associated with the functions of "open", "call" and "SMS" respectively. It is to be appreciated that other functions could be used in other embodiments.

In the embodiment illustrated in FIG. 5 each of the actuated areas 63A, 63B and 63C are substantially the same shape. It would be appreciated by a person skilled in the art that this need not be the case. For example, if a user actuates a larger area by applying a larger force to the touch sensitive display 15 then this may also change the shape of the area which is actuated.

Figure 6:
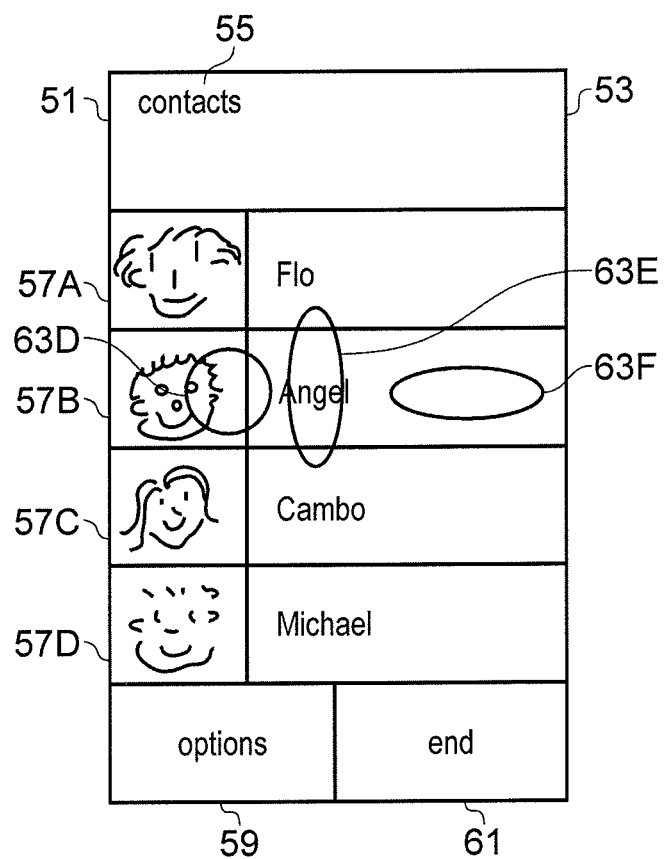
FIG. 6 illustrates a graphical user interface according to a second exemplary embodiment of the invention.

FIG. 6 illustrates a graphical user interface 51 according to a second exemplary embodiment of the invention. The graphical user interface 51 illustrated in FIG. 6 comprises the same contact list 53, label 55, items 57A to 57D and items 59 and 61 as illustrated in FIG. 5 and described above.

In the exemplary embodiment in FIG. 6 the controller 4 can distinguish between different shaped actuated areas and also the orientation of the actuated areas. The actuated areas 63D, 63E and 63F which are illustrated in FIG. 6 represent areas which may have been actuated by the user. It is to be appreciated that these areas are illustrated for explanatory purposes and would not necessarily be actuated simultaneously. Also the three areas 63D, 63E and 63F have been illustrated adjacent to each other for the purpose of clarity. It is to be appreciated that in embodiments of the invention the actuated area could comprise any area which includes a portion of the second item 57B.

In FIG. 6 the first area 63D has a substantially circular shape. The controller 4 may determine that the first area 63D has been actuated if the major axis and the minor axis of the actuated area are determined to be approximately the same.

The second area 63E illustrated in FIG. 6 is a different shape to the first area 63D. The second area 63E is substantially an ellipse with a major axis which is substantially larger than the minor axis. The ellipse is oriented with the major axis substantially vertical and the minor axis substantially horizontal. The controller may 4 determine that the second area 63E has been actuated if it determines that the height of the actuated area 63E is substantially greater than the width.

The third area 63F illustrated in FIG. 6 is a similar shape to the second area 63E but is provided at a different orientation. The third area 63F is also substantially an ellipse however in the third area 63F the ellipse is oriented with the major axis substantially horizontal and the minor axis substantially vertical. The controller may 4 determine that the third area 63F has been actuated if it determines that the width of the actuated area 63F is substantially greater than the height.

As described above in relation to FIG. 5 the three areas 63D, 63E and 63F are associated with the functions of "open", "call" and "SMS" respectively. It is to be appreciated that other functions could be used in other embodiments. The embodiments illustrated in FIG. 6 enable a user to access a plurality of functions by actuating different shaped or oriented areas. The difference in shapes and orientations may be achieved by using different thumbs or fingers to actuate the touch sensitive display 15 or by changing the orientation that they actuate the touch sensitive display 15. These inputs could be simple for a user to make.

In FIG. 6 the second area 63E extends outside the boundary of the item 57B and comprises a portion of the location in which other items 57A and 57C are displayed. The controller 4 may be configured to determine which item 57 corresponds to the majority of the actuated area 63E and enable the function accordingly. This may prevent the functions being enabled with respect to an incorrect item 57.

Figure 7:
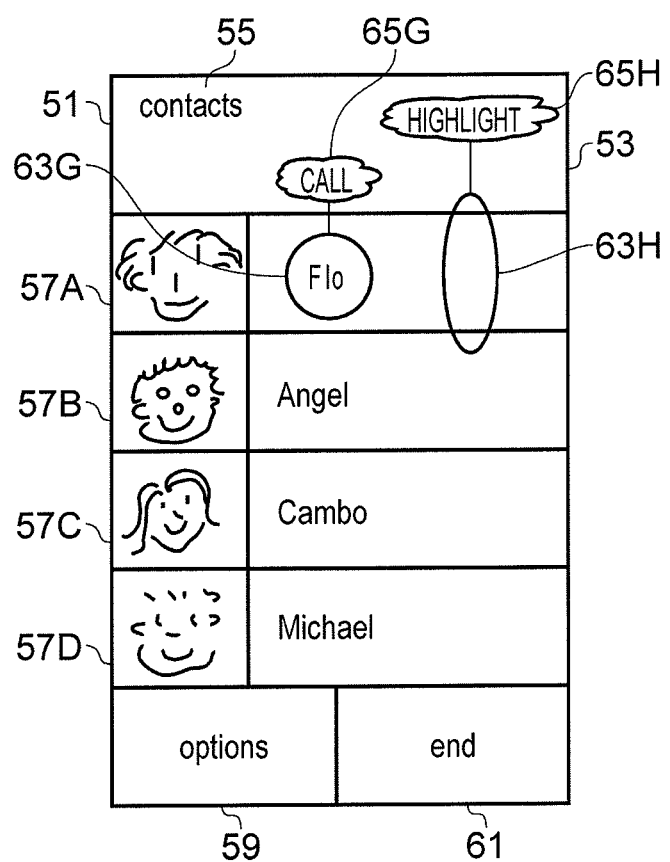
FIG. 7 illustrates a graphical user interface according to a third exemplary embodiment of the invention.

FIG. 7 illustrates a graphical user interface 51 according to a third exemplary embodiment of the invention. The graphical user interface 51 illustrated in FIG. 7 comprises the same contact list 53, label 55, items 57A to 57D and items 59 and 61 as illustrated in FIGS. 5 and 6 and described above.

As in the embodiment illustrated in FIG. 6, in the embodiment illustrated in FIG. 7, the controller 4 is configured to distinguish between different shaped actuated areas. The actuated areas 63G and 63H illustrated in FIG. 7 represent areas which may have been actuated by the user. It is to be appreciated that these areas are illustrated for explanatory purposes and would not necessarily be actuated simultaneously. Also the areas 63G and 63H have been illustrated adjacent to each other for the purpose of clarity. It is to be appreciated that in embodiments of the invention the actuated area could comprise any area which includes a portion of the second item 57A, and as such could overlap on the touch sensitive display 15 in some embodiments of the invention.

In FIG. 7 the first area 63G has a substantially circular shape and the second area 63H is substantially an ellipse with a major axis aligned substantially vertically. The controller 4 may distinguish between these two areas as described above.

In FIG. 7 the first area 63G is associated with the function of "open" which enables the user to open the contact item 57A and view the content associated with the item 57A. A label 65G may be displayed on the touch sensitive display 15 to indicate the function that is to be enabled. The second area 63H is associated with the function of "highlight". The highlight function may cause the item 57A to be indicated as highlighted, for example by marking the item or changing the display of the item 57A on the touch sensitive display. The highlight function may enable the user of the apparatus 1 to select a plurality of items 57 in the list 53. The user may then be able to select a function to be carried out on all of the selected items 57. Therefore the embodiments of the invention as illustrated in FIG. 7 provide a simple way of enabling a user to simultaneously select a plurality of different items using a touch sensitive display 15.

Figure 8A:
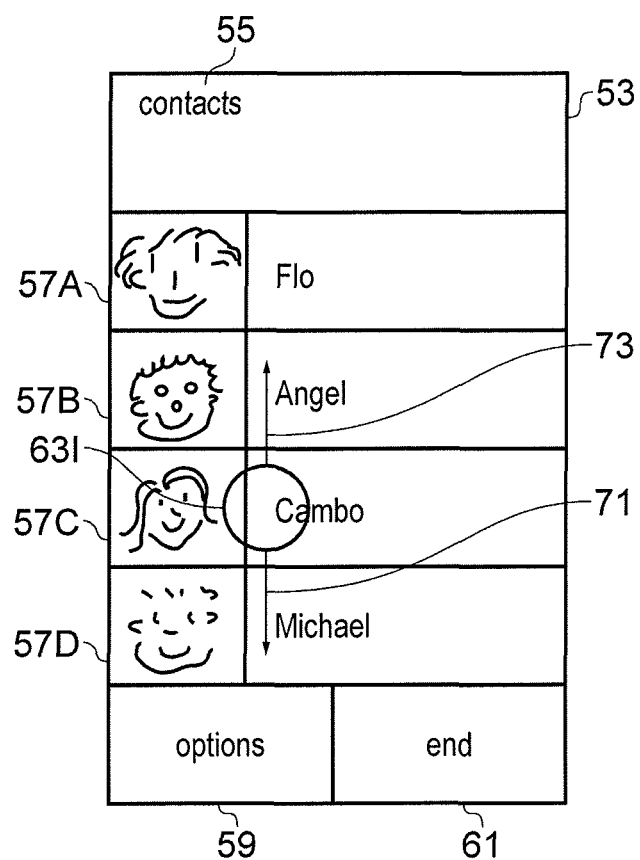
FIGS. 8A and 8B illustrate graphical user interfaces according to a fourth exemplary embodiment of the invention.
Figure 8B:
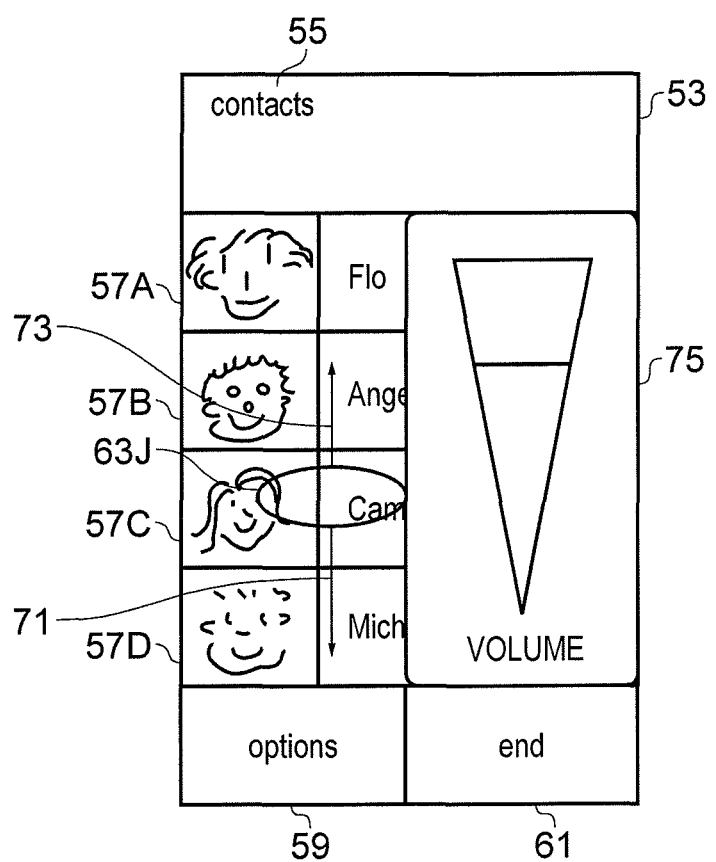

FIGS. 8A and 8B illustrate a graphical user interface 51 according to a fourth exemplary embodiment of the invention. The graphical user interface 51 illustrated in FIGS. 8A and 8B comprises the same contact list 53, label 55, items 57A to 57D and items 59 and 61 as illustrated in FIGS. 5, 6 and 7 and described above.

In the exemplary embodiment in FIGS. 8A and 8B the controller 4 is configured to distinguish between different shaped actuated areas and also determine whether or not the user has made a trace input subsequent to actuating the area.

The actuated areas 63I and 63J illustrated in FIGS. 8A and 8B represent areas which may have been actuated by the user. It is to be appreciated that these areas are illustrated for explanatory purposes.

In FIG. 8A the user has actuated the first area 63I, which is substantially circular in shape, by using an object such as their finger to make contact with the touch sensitive display 15. The user may then make a trace input by maintaining contact with the touch sensitive display 15 and moving their finger across the surface of the touch sensitive display 15. In the embodiment illustrated in FIG. 8A the user may move their finger downwards towards the bottom of the touch sensitive display 15 in the general direction indicated by arrow 71 or the user may move their finger upwards towards the top of the touch sensitive display 15 in the general direction indicated by arrow 73.

In response to the detection of such a user input the controller 4 may control the apparatus 1 to enable the user to scroll through the list of items 53. The direction of the scrolling may correspond to the direction of the trace user input.

In FIG. 8B the user has actuated the second area 63J, which is substantially an ellipse in shape. In FIG. 8B the ellipse has the major axis aligned substantially horizontally although in other embodiments different shapes and/or orientations may be used. In FIG. 8B the user may also make a trace input by maintaining contact with the touch sensitive display 15 and moving their finger across the surface of the touch sensitive display 15 in the general directions indicated by the respective arrows 71 and 73.

In response to the detection of the user input illustrated in FIG. 8B the controller 4 may control the apparatus 1 to enable access to a function which is independent of the items displayed on the touch sensitive display 15 when the user input is initiated. For example, in response to the detection of the user input illustrated in FIG. 8B the controller 4 may control the apparatus 1 to enable access to a function which is not directly related to the contact list 53. For example, In FIG. 8B it enables a user to adjust the setting of a generic function of the apparatus such as the volume control. Different actuated areas may enable access to different generic functions, for example a different shaped user input may enable a user to adjust the brightness of the touch sensitive display 15 or any other function.

In FIG. 8B a control bar 75 is displayed on the touch sensitive display 15 which corresponds to the setting which is being adjusted. The setting, which in this example is volume, may be increased or decreased depending on the direction in which the user moves their finger.

FIGS. 8A and 8B illustrate a method comprising: displaying information on a touch sensitive display; detecting actuation of an area of the touch sensitive display; and in response to the detecting, enabling a function to be performed wherein if a first area is actuated a first function relating to the displayed information is enabled and if a second area is actuated a second, different function relating to information which is not displayed is enabled.

In the embodiment illustrated in FIGS. 8A and 8B the first function is associated with a first application and the second function is associated with a second different application. In particular in the illustrated embodiment the first function is associated with the contacts or phonebook application while the second function is associated with the volume of the apparatus 1. The volume of the apparatus 1 may be a general function of the apparatus 1. The volume may also be associated with other functions of the apparatus which may be currently running on the apparatus. For example it may relate to a media application which enables audio files to be provided to a user via a loudspeaker or headset.

In the illustrated embodiments, when the second function is enabled the display 15 is configured to display further information relating to the second function. This may make it easier for the user to control the second function.

In the illustrated embodiments, the function is enabled in response to the detection of the actuation of an area and a trace user input. It is to be appreciated that other types of input or sequences of input may be used in alternative embodiments of the invention.

Embodiments of the invention as described in relation to FIGS. 8A and 8B enable a user to use different sized and shaped areas of actuation to access different functions of the apparatus 1. The different functions may relate to general functions of the apparatus such as volume and brightness or any other function which may be directly associated with a plurality of different applications. In some embodiments of the invention the different sized and shaped areas of actuation may enable a user to access different levels of a menu. For example, a first type of actuated area may be associated with an item at a first menu level while a second type of actuated area may enable the use to access a different menu level or enable a function associated with a different menu level. This provides a quick and simple way for the user to access the respective functions of the apparatus 1.

In the above embodiments two different functions may be enabled depending on which of two different areas at least partially within the location of a displayed item is actuated. The embodiments provide at least one first function enabled when a first area at least partially within the location of a displayed item on a touch sensitive display is actuated. The first function may be dependent on the item displayed at that location. The embodiments also provide at least one other function enabled when at least one other area is actuated where the at least one other area is also at least partially within the location of the same displayed item. The other function may be independent of the first function. The other function may be independent of the displayed item.

The other function which may be independent of the first function and the displayed item may comprise a generic function which may be dependent on the apparatus 1 or applications currently running on the apparatus 1. For example the function may comprise adjusting a setting of the apparatus 1. Examples of such apparatus 1 settings include: an audio setting (such as volume control), a video setting (such as a display setting such as a zoom level or font size), a connectivity setting (for example, turning on or off the apparatus connectivity or switching between communication networks such as between a wireless local area network (WLAN) and a cellular communications network, or switching between SIM cards in a dual-SIM device).

A generic function may comprise a function which is independent of an application associated with the displayed item so that enabling the generic function does not directly affect the displayed item. In embodiments of the invention where a plurality of items may be displayed on the display 15 the generic function may be enabled in the enabled in the same way for each of the items or for each item having a particular characteristic.

In some embodiments the other function which may be independent of the first function and the displayed item may comprise a function which is associated with a different application to the first function. The different application may be one which is currently running on the apparatus 1.

Figure 9:
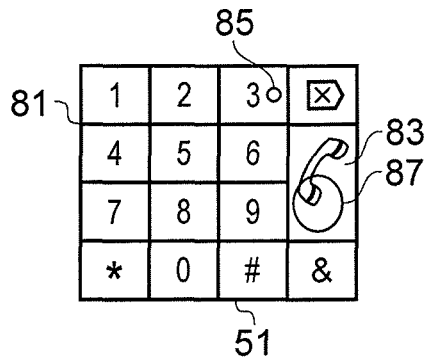
FIG. 9 illustrates a graphical user interface according to a fifth exemplary embodiment of the invention.

FIG. 9 illustrates a graphical user interface 51 according to a fifth exemplary embodiment of the invention. The graphical user interface 51 illustrated in FIG. 9 comprises a numeric keypad 81 which comprises a plurality of user selectable areas. In the exemplary embodiment illustrated in FIG. 9 the numeric keypad 81 is an ITU-T keypad and comprises a plurality of user selectable items corresponding to the numbers 0-9 and a * and # selectable item. A user may enter a number such as a telephone number by actuating the respective areas in which the user selectable items are displayed.

The graphical user interface 51 illustrated in FIG. 9 also comprises a call user selectable item 83. A user may enable the apparatus 1 to make a telephone call by actuating the area in which the call user selectable item 83 is displayed.

In the embodiment of FIG. 9 the user selectable items of the numeric keypad 81 may be actuated by actuating a first area 85 of the item. The first area may have dimensions below a predetermined threshold. The call user selectable item 83 may only be actuated by actuating an area 87 above a predetermined threshold. Therefore in the embodiment illustrated in FIG. 9 a larger area of the touch sensitive display 15 must be actuated in order to enable the function of calling a number. This provides the advantage that it reduces the chance of a user accidentally actuating the call item 83 and inadvertently making a telephone call. However, by enabling the numeric keys of the keypad 81 to be actuated by actuating a smaller area this enables a user to quickly enter information such as numbers into the apparatus 1.

In the exemplary graphical user interface illustrated in FIG. 9 the call item 83 is larger than the rest of the items in the numerical keypad 83. This provides an indication to the user that they must actuate a larger area in order to enable the call function.

It is to be appreciated that the embodiment illustrated in FIG. 9 need not be restricted to a numerical keypad and the call function. The embodiment of FIG. 9 may be useful wherever a user interface allows a critical action to be enabled. A critical action may be one which cannot easily be reversed such as calling a telephone number, sending a message, authorizing a payment or deleting content.

Figure 10:
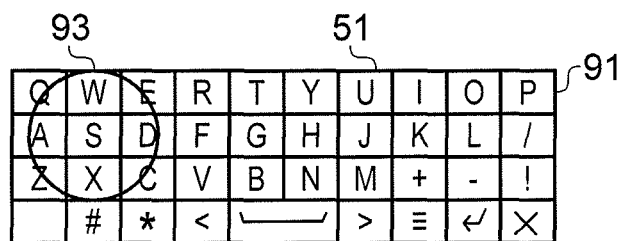
FIG. 10 illustrates a graphical user interface according to a sixth exemplary embodiment of the invention.

FIG. 10 illustrates a graphical user interface 51 according to a sixth exemplary embodiment of the invention. The graphical user interface 51 illustrated in FIG. 10 comprises a QWERTY keypad 91 which comprises a plurality of user selectable areas. The QWERTY keypad 91 may enable a user to input text into the apparatus 1.

In the embodiment illustrated in FIG. 10 the controller 4 is configured to detect actuated areas of different size. If the actuated area is above a threshold size this may be determined to be an accidental actuation and not the intentional selection of a key in the keypad 91 and so no function may be enabled in response to the detection of such an actuation.

In the embodiment illustrated in FIG. 10 an area 93 has been actuated. The area 93 is larger than the items in the keypad 91. The actuated area 93 comprises the location of the touch sensitive display 15 in which the items corresponding to the letters W, A, S, D and X are displayed. The controller 4 may determine that the actuated area is above a predetermined threshold and so may determine that no function should be enabled in response to the actuation of the area 93

Embodiments of the invention as illustrated in FIG. 10 provide the advantage that they reduce the chance of accidental input.

Figures 11A, 11B, 11C:
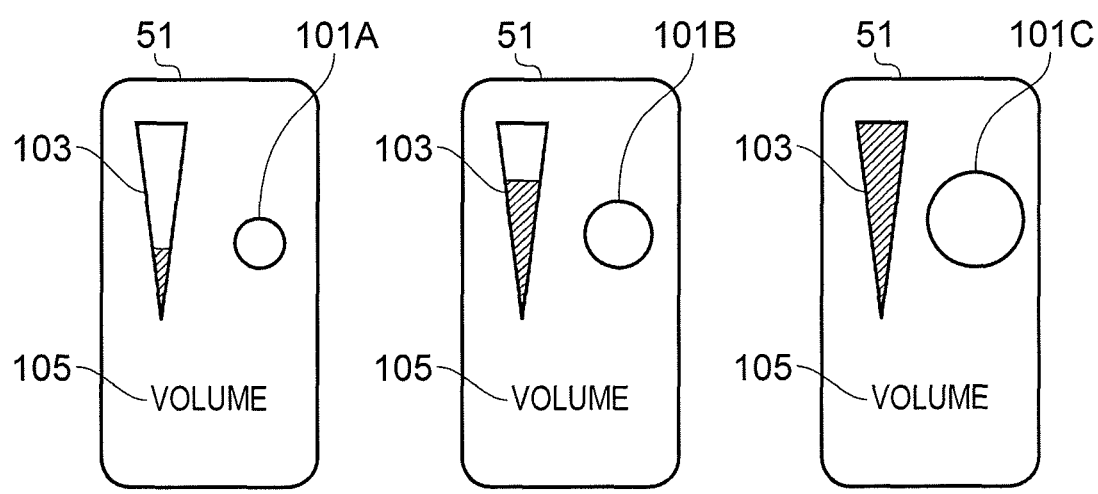
FIGS. 11A to 11C illustrate graphical user interfaces according to a seventh exemplary embodiment of the invention.

FIGS. 11A to 11C illustrate graphical user interfaces 51 according to a seventh exemplary embodiment of the invention.

In the embodiment illustrated in FIGS. 11A to 11C the controller 4 is configured to detect actuated areas of different size and control a setting of the apparatus 1 in response to the detection of the actuated area. The controller 4 may be configured to detect a change in the actuated area and adjust a setting in response to the change.

A control bar 103 may be displayed on the touch sensitive display 15 indicative of the setting which is being adjusted. In the exemplary embodiment illustrated in FIG. 11 the user is adjusting the volume of the apparatus. It is to be appreciated that the embodiment of FIG. 11 may be used to adjust any other suitable setting. A label 105 is displayed on the touch sensitive display 15 indicating that the volume is being adjusted.

In FIG. 11A a first area 101A has been actuated. In response to the detection of this actuation the volume is set to a first level as indicated by the control bar 103.

In FIG. 11B the user has actuated a second area 101B. The second area 101B is larger than the first area 101A. The controller 4 detects the change in the actuated area and increases the volume level of the apparatus accordingly. The increase in the volume level is indicated in the control bar 103.

In FIG. 11C the user has actuated a third area 101C. The third area 101C is larger than both the first area 101A and the second area 101B. The controller 4 detects the change in the actuated area to the third area 101C and increases the volume level of the apparatus accordingly. The increase in the volume level is indicated in the control bar 103.

It is to be appreciated that a user could decrease the volume or other setting of the apparatus 1 by decreasing the area which had been actuated.

The embodiments of FIG. 11 provide a simple and intuitive way for a user to control the settings of an apparatus 1. In other embodiments of the invention a user could adjust a setting by actuating two separate areas of the touch sensitive display 15. A control bar may be displayed between the two actuated areas. A user could then adjust the setting by increasing or decreasing the respective dimensions of the actuated areas.

The blocks illustrated in the FIGS. 3 and 4 may represent steps in a method and/or sections of code in the computer program code 9. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
associating a first contact input type with at least one of a first type of object or a first orientation of a touch object;
associating a second contact input type with at least one of a second type of object or a second orientation of the touch object;
causing displaying of an item at a location on a touch sensitive display;
detecting an initial actuation made by the touch object, of a continuous area of the touch sensitive display wherein the initially actuated area comprises at least a portion of the location in which the item is displayed;
determining a size and shape of the initially actuated area;
determining at least one of an object type or detected orientation of the touch object based on at least one of the size or the shape of the initially actuated area;
determining whether the initially actuated area is associated with the first contact input type or the second contact input type based on at least one of the determined object type or the determined orientation of the touch object; and
in response to the detecting the initial actuation, enabling a function to be performed, wherein if the first contact input type is determined, a first function, dependent on the item, is enabled and if the second contact input type is determined, a second, different function, is enabled, wherein the second function comprises a generic function of an apparatus that is displaying the item, wherein enabling the second function comprises causing display on the touch sensitive display of a control to allow control of the generic function, and wherein the second function is enabled responsive to determination that a contact input of the second contact input type is made to any application operative on the apparatus.

2. A method as claimed in claim 1 comprising:
in an instance the second contact input type is determined, and subsequent to the display of the control, detecting a change in one or more dimensions of the initially actuated area to provide a second actuated area, and controlling the generic function in response to the change.

3. A method as claimed in claim 1 wherein the item is one of a plurality of items simultaneously displayed on the touch sensitive display.

4. A method as claimed in claim 1 wherein the second function is the same for any of the plurality of items displayed on the touch sensitive display.

5. A method as claimed in claim 1 wherein if a third area is actuated, a third, different function is enabled.

6. A method as claimed in claim 1 wherein the item is associated with the first application, and the first function which is enabled is a function of the first application, and the second, different function which is enabled is a generic function of an apparatus.

7. A method as claimed in claim 1 wherein the item is associated with the first application, and the first function which is enabled is a function of the first application, and the second, different function which is enabled is a function of a second, different application.

8. A method as claimed in claim 1 wherein determining whether the initially actuated area is associated with the first type input or the second type input further comprises determining a shape of the initially actuated area.

9. A method as claimed in claim 1 wherein the first area comprises a different orientation to the second area.

10. A method as claimed in claim 1 wherein the functions are enabled in response to detection that the initially actuated area has been actuated for at least a predetermined time.

11. A method as claimed in claim 10 wherein the first function is enabled in response to detection of a change of the initially actuated area.

12. A method as claimed in claim 1 wherein the second function is enabled in response to detection of a change of the initially actuated area.

13. A method as claimed in claim 1 wherein the second function relates to information which is not displayed on the display.

14. A method as claimed in claim 13 wherein, when the second function is enabled the display is configured to display further information relating to the second function.

15. An apparatus comprising:
at least one processor; and
at least one memory including computer program code;
wherein the at least one memory and the computer program code are configured to, with the at least one processor, enable the apparatus to:
associate a first contact input type with at least one of a first type of object or a first orientation of a touch object;
associate a second contact input type with at least one of a second type of object or a second orientation of the touch object;
cause display of an item at a location on a touch sensitive display;
detect an initial actuation made by the touch object, of a continuous area of the touch sensitive display wherein the initially actuated area comprises at least a portion of the location in which the item is displayed;
determine a size and shape of the initially actuated area;
determine at least one of an object type or detected orientation of the touch object based on at least one of the size or the shape of the initially actuated area;
determine whether the initially actuated area is associated with the first contact input type or second contact input type based on at least one of the determined object type or the determined orientation of the touch object; and
enable, in response to the detection of the initial actuation, a function to be performed wherein if the first contact input type is determined, a first function, dependent on the item, is enabled and if the second contact input type is determined, a second, different function, is enabled, wherein the second function comprises a generic function of the apparatus that is displaying the item, wherein enabling the generic function comprises causing display on the touch sensitive display of a control to allow control of the second function, and wherein the second function is enabled responsive to determination that a contact input of the second contact input type is made to any application operative on the apparatus.

16. An apparatus as claimed in claim 15 wherein the first area and the second area at least partially overlap.

17. A non-transitory physical entity embodying a computer program comprising computer program instructions that, when executed by at least one processor, enable an apparatus at least to perform:
associating a first contact input type with at least one of a first type of object or a first orientation of a touch object;

associating a second contact input type with at least one of a second type of object or a second orientation of the touch object;
causing display of an item at a location on a touch sensitive display;
detecting an initial actuation made by the touch object, of a continuous area of the touch sensitive display wherein the initially actuated area comprises at least a portion of the location in which the item is displayed;
determining a size and shape of the actuated area;
determining at least one of an object type or detected orientation of the touch object based on at least one of the size or the shape of the initially actuated area;
determining whether the initially actuated area is associated with the first contact input type input or the second contact input type input based on at least one of the determined object type or the determined orientation of the touch object; and
in response to detecting the initial actuation, enabling a function to be performed wherein if the first contact input type is determined, a first function, dependent on the item, is enabled and if the second contact input type is determined, a second, different function, is enabled, wherein the second function comprises a generic function of an apparatus that is displaying the item, wherein enabling the second function comprises causing display on the touch sensitive display of a control to allow control of the generic function, and wherein the second function is enabled responsive to determination that a contact input of the second contact input type is made to any application operative on the apparatus.

* * * * *